United States Patent [19]

Tamura et al.

[11] 4,243,921
[45] Jan. 6, 1981

[54] DIGITAL SERVO SYSTEM FOR ROTATING MEMBER

[75] Inventors: Masaaki Tamura, Fujisawa; Shigeo Tanaka, Kawasaki, both of Japan

[73] Assignee: Tokyo Shibaura Denki Kabushiki Kaisha, Kawasaki, Japan

[21] Appl. No.: 933,911

[22] Filed: Aug. 15, 1978

[30] Foreign Application Priority Data

Aug. 22, 1977 [JP] Japan .................................. 52-100315

[51] Int. Cl.³ ................................................ A02P 5/16
[52] U.S. Cl. .................................... 318/314; 318/318; 318/341; 318/608; 331/1 A; 331/12
[58] Field of Search ............... 318/314, 318, 341, 608; 360/70, 73; 235/92 FQ, 92 TF; 328/134; 331/1 A, 12; 242/190

[56] References Cited

U.S. PATENT DOCUMENTS

| | | | |
|---|---|---|---|
| 3,361,949 | 1/1968 | Brown et al. | 318/314 |
| 3,478,178 | 11/1969 | Grace | 318/318 |
| 3,628,114 | 12/1971 | Pattantyus | 318/314 |
| 3,646,417 | 2/1972 | Cassie | 318/318 |
| 3,836,756 | 9/1974 | Yammoto et al. | 360/70 |
| 3,950,682 | 4/1976 | Dohanich, Jr. | 318/318 |
| 4,086,520 | 4/1978 | Hashizaki et al. | 318/269 |

FOREIGN PATENT DOCUMENTS 1452559 10/1976 United Kingdom .

Primary Examiner—David Smith, Jr.
Attorney, Agent, or Firm—Cushman, Darby & Cushman

[57] ABSTRACT

A digital servo system for a rotating member which detects a difference between phases of a reference signal and a signal representing the rotation phase of the rotating member thereby to control its rotation in accordance with the phase difference. Comparison is made by a digital rotation phase comparator between points of time at which first and second predetermined counts are made by a clock pulse counter which is cleared for each period of the reference signal and a point of time at which the rotation phase information signal of the rotating member is produced. When the rotation phase signal appears during an interval between the first and second counts, a latch signal is generated in synchronization with the rotation phase signal to cause an instantaneous count between the first and second counts of the counter to be loaded into a latch circuit. A pulse width modulator generates a pulse train whose width corresponds to the latched count; and the rotation of the rotation member is controlled in accordance with a DC output voltage level of a driving circuit which corresponds to the pulse width of the pulse width modulated signal.

10 Claims, 10 Drawing Figures

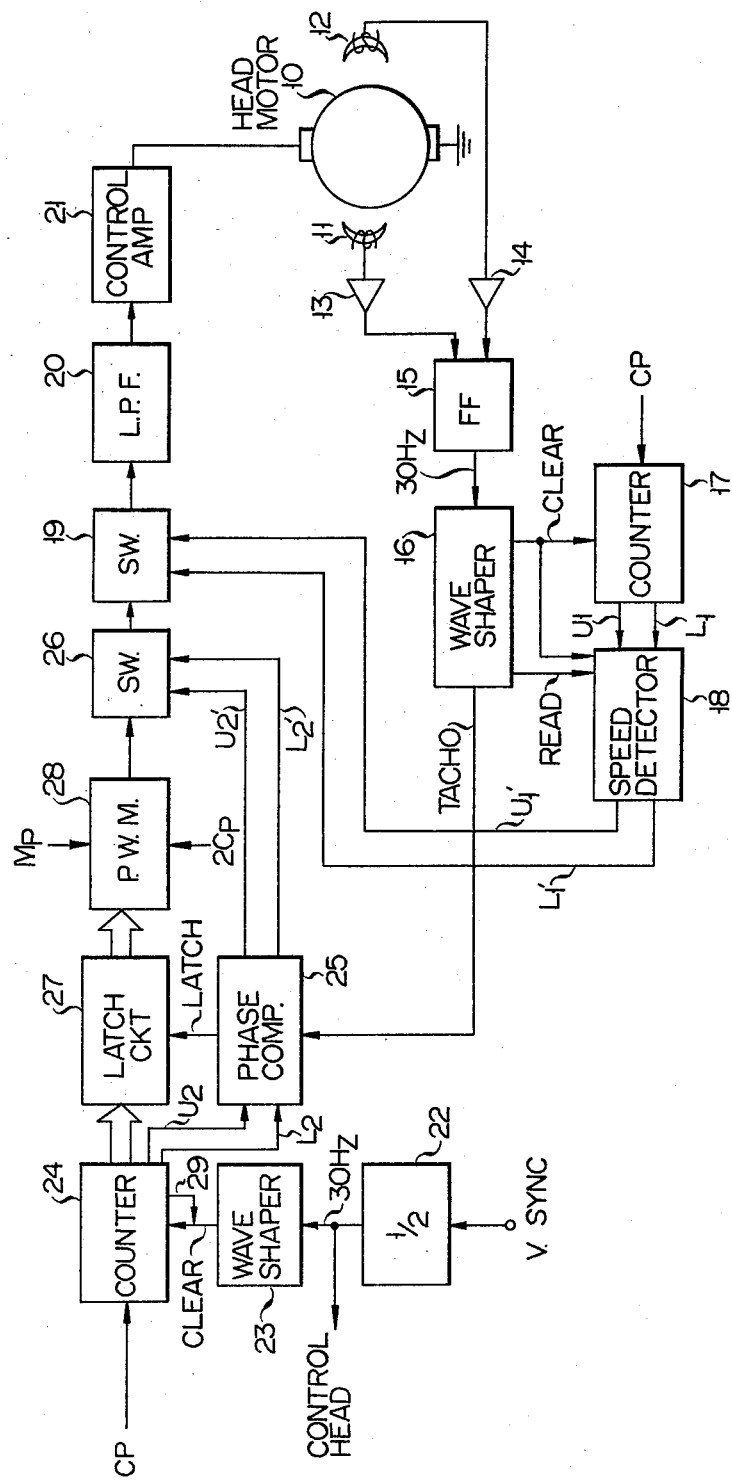
F I G. 1

(A) REFERENCE SIGNAL
(B) CLEAR PULSE
(C) OUTPUT OF FF 15
(D) TACHO SIGNAL

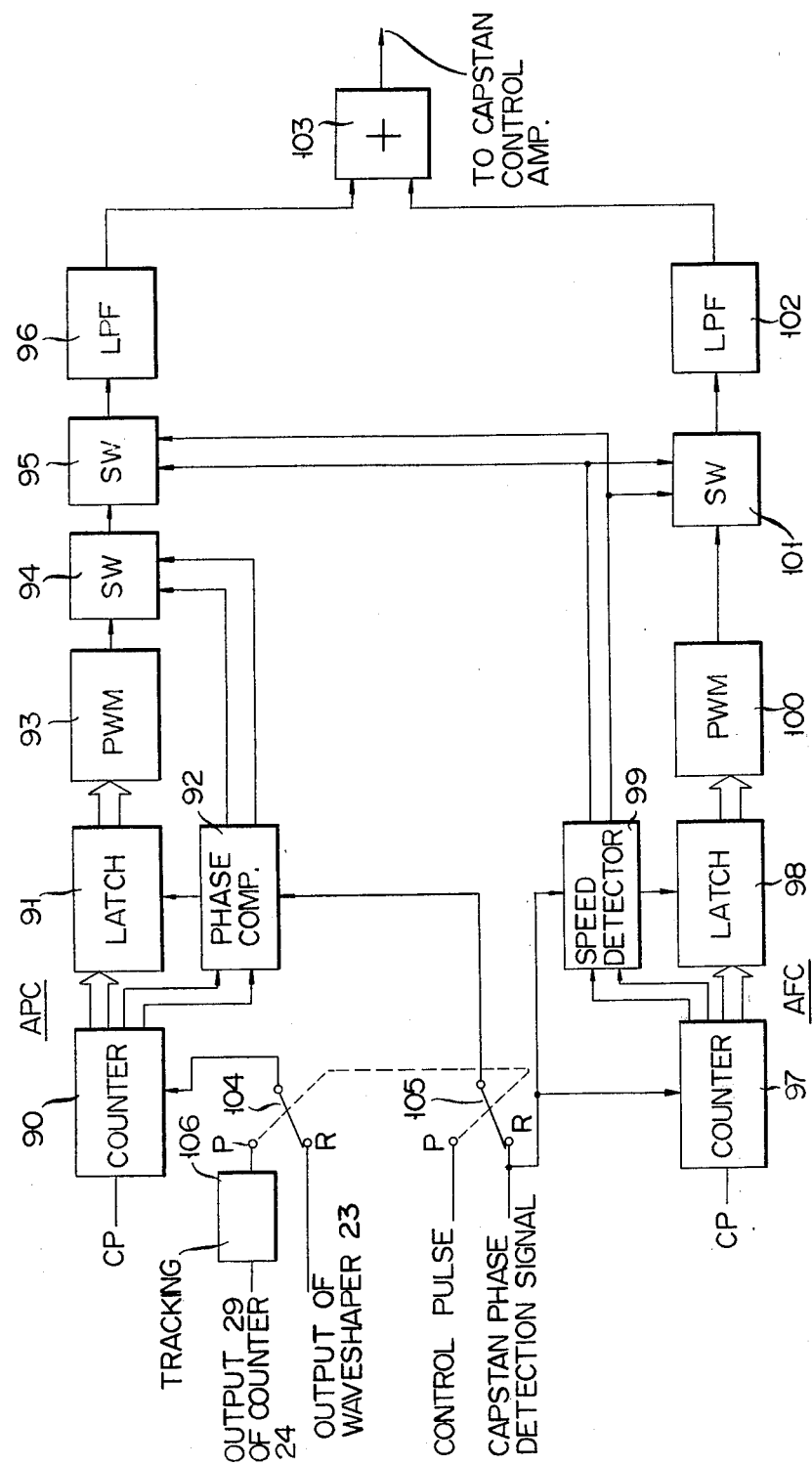

DIGITAL SERVO SYSTEM FOR ROTATING MEMBER

BACKGROUND OF THE INVENTION

This invention relates to a servo system for a rotating member, and, more particularly, to a digital servo system for a rotating member.

With a video tape recorder, for example, a servo system including automatic frequency control (AFC) and automatic phase control (APC) is applied to control the rotation speed and phase of rotating members such as motors for driving a head disk and a capstan. With prior art video tape recorders, an analog servo system is generally used. According to a typical APC analog servo system for a head disk or head motor, a reference signal (a vertical synchronizing signal whose frequency is divided by a factor of two) has its waveform shaped to provide a sampling pulse. A rectangular rotation phase signal having the same frequency as the reference signal is formed of outputs from two disk tone heads spaced 180° from each other and converted into a ramped trapezoidal signal. The ramp portion of the trapezoidal signal is sampled by the sampling pulse and held in a sample and hold circuit. The magnitude of the sampled signal thus held represents the momentary rotation phase of the head disk relative to the reference signal. The sampled analog signal in the sample and hold circuit is converted into a direct-current signal by a lowpass filter. The converted direct-current signal controls the head disk motor through a motor control amplifier.

The analog servo system so far described requires a sample and hold circuit necessitating a large capacitor and thus makes difficult integrated circuit version of a servo circuit. Moreover, parts used in the analog servo system are harmfully affected by secular changes in property as well as by variations in ambient temperature. The control loop of the analog servo system is prominently affected by external noises.

SUMMARY OF THE INVENTION

It is accordingly the object of this invention to provide a servo system for a rotating member which need not use a large value capacitor; is free from harmful effects resulting from secular changes in property of elements used and variations in ambient temperature; is litte affected by external noises; and is suitable for integrated circuit version.

According to this invention there is provided a digital servo control system for a rotating member in which the phase difference between a reference signal having a predetermined period and a rotation phase information signal of the rotating member is detected to control the rotation of the rotating member according to the phase difference, said system comprising: a counter counting clock signals with a fixed frequency and arranged to be cleared at the period of the reference signal; a latch circuit responsive to a latch signal to latch an instantaneous count information of said counter; pulse width modulation circuit means for producing an output pulse signal having a pulse width which is a function of the count information latched in said latch circuit; driving means having an input coupled to an output of said pulse width modulation circuit means for controlling the rotation of said rotating member in accordance with the pulse width of output pulse signal of said pulse width modulation circuit means; and digital phase comparing means responsive to outputs of said counter and the rotation phase information signal of said rotating member for producing the latch signal only when the rotation phase information signal of said rotating member occurs during a time inverval between a time at which said counter counts a first predetermined count number and a time at which said counter counts a second predetermined count number.

BRIEF DESCRIPTION OF THE DRAWING

FIG. 1 is a schematic block diagram of a digital servo system for a head motor embodying this invention;

FIG. 10 is a schematic block diagram of a capstan servo system which may be preferably used with the head motor digital servo system of FIG. 1.

DESCRIPTION OF THE PREFERRED EMBODIMENTS

Figure 2:
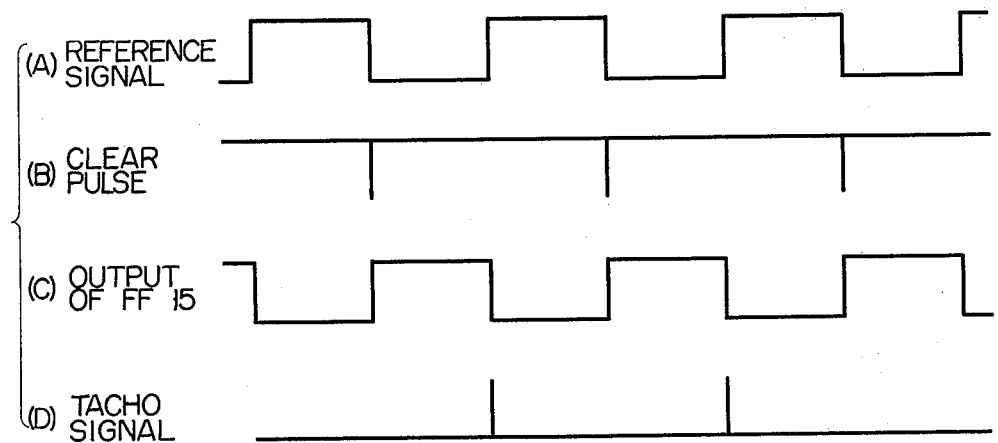
FIG. 2 illustrates waveforms, indicating a typical phase relationship between a reference signal and a signal denoting information on the rotation phase of the head motor whose phases are to be compared.

FIG. 1 shows a head disk digital servo system according to one embodiment of this invention which includes APC and AFC systems. The rotation phase of a DC motor 10 for rotating a video head disk is detected by first and second disk tone heads 11 and 12 spaced 180° from each other in a conventional manner. The disk tone heads 11 and 12 produce a detection pulse when facing a magnet placed on the head disk. The disk tone heads 11 and 12 respectively produce one detection pulse, each time the head disk makes one full rotation. Output detection pulses from the disk tone heads 11 and 12 are respectively coupled to set and reset inputs of a flip-flop circuit 15 through suitable amplifiers 13 and 14. As a result, the flip-flop circuit 15 produces a rectangular wave signal having the same period as one rotation period of the head disk. The output rectangular wave signal typically has a frequency of 30 Hz. The output signal of the flip-flop circuit 15 is applied to a wave shaper 16 which produces a CLEAR pulse to be applied to a digital counter 17, a READ pulse to be applied to a rotation speed detector 18 to read out a count output of the digital counter 17, and a pulse TACHO representing the rotation phase of the head disk or head motor. These pulses have the same frequency as the output of the flip-flop circuit 15. The wave shaper 16 comprises a tracking adjusting circuit and a circuit for synchronizing output signals of the wave shaper 16 with a clock pulse CP.

The digital counter 17 has its count cleared, each time a CLEAR pulse is received from the wave shaper 16, and thereafter commences fresh counting of clock pulses CP. The digital counter 17 continues to count clock pulses CP, while the head disk makes one full rotation. A count number just before being cleared represents information on rotation speed of the head disk or head motor. The digital counter 17 comprises first and second outputs U1 and L1 which respectively produce an upper limit speed-detection signal and a lower limit speed-detection signal when the digital counter 17 makes counts corresponding to the upper limit and lower limit speeds defining a predetermined rotation speed range of the head disk.

The READ pulse is always produced prior to the CLEAR pulse. The rotation speed detector 18 examines generation timing of the upper limit speed-detection signal U1 and the lower limit speed-detection signal L1 from the digital counter 17 and the READ pulse. The rotation speed detector 18 is provided with outputs U1' and L1' which are set at a voltage level of "1" or "0" according to the result of the aforesaid examination. Thus, the voltage level of the output of a switch circuit 19 is controlled according to voltage levels of the outputs U1' and L1'.

When the READ pulse appears before the lower limit speed-detection signal L1, namely, when the head disk is rotating at a lower rate than the lower limit speed, the output of the switch circuit 19 is made at a potential level to accelerate the rotation of the head motor 10. The output of the switch circuit 19 is conducted to the head motor 10 through a motor driving circuit including a lowpass filter 20 and motor control amplifier 21.

When the READ pulse is issued after the upper limit speed-detection signal U1, in other words, when the head disk is rotating at a faster rate than the upper limit speed, the output of the switch circuit 19 is made at such a voltage level as decelerates the rotation of the head motor 10.

When the READ pulse is generated after the lower limit speed detection signal L1 and yet before the upper limit speed detection signal U1, namely, when the head motor 10 is rotating at a speed falling within the predetermined range, the switch circuit 19 is so operated as to couple the output of a later described APC servo circuit to the motor driving circuit.

The above-mentioned servo system is of AFC type, by which the head motor 10 is controlled so that its rotation speed falls within the predetermined range.

There will now be described APC system of the digital servo system. In this APC system, a 60 Hz vertical synchronizing signal separated from a received television signal has its frequency divided by a factor of two by a divider 22 to provide a reference signal of 30 Hz. The reference signal is supplied to a wave shaper 23, which in turn generates a CLEAR pulse, in synchronizm with the clock pulse CP, for clearing a digital counter 24 for each period of the reference signal. The digital counter 24 is provided with outputs U2 and L2 from which there are drawn out an upper limit phase detection signal and a lower limit phase detection signal when the digital counter 24 counts the upper limit and lower limit values defining a predetermined rotation phase controllable range of the head disk. A digital phase comparator 25 is provided to examine generation timings of the rotation phase detection signal TACHO, and the upper limit phase detection signal U2 and the lower limit phase detection signal L2 of the digital counter 24. The phase comparator 25 is provided with outputs U2' and L2', which are set at a a voltage level of "1" or "0" according to the result of the aforesaid examination. The APC switch circuit 26 is controlled according to the voltage levels of the outputs U2' and L2' of phase comparator 25.

When the head motor is rotated at a speed falling within the predetermined range by the aforesaid AFC system, and yet, when the rotation phase detection signal TACHO is generated before the lower limit phase detection signal appears at the output L2 or after the upper limit phase detection signal is produced at the output U2, namely, when the rotation phase of the head disk falls outside of the predetermined range, then the phase comparator 25 renders the output of the switch circuit 26 at a voltage level of "1" or "0". Thus, the head motor is accelerated or decelerated so that its rotation phase is captured within the predetermined range. Under this condition, the rotation phase detection signal TACHO is issued after the lower limit phase detection signal appears at the output L2 of the digital counter 24 and before the upper limit phase detection signal appears at the output U2 of digital counter 24. Accordingly, the phase comparator 25 produces a LATCH signal in synchronization with the rotation phase detection signal TACHO. The latch signal causes the count information in the digital counter 24 to be latched by a latch circuit 27. Namely, the instantaneous count information of the digital counter 24 is sampled by the LATCH signal and held in the latch circuit 27. The output of latch circuit 27 is coupled to a later described pulse width modulator 28, which in turn issues a pulse train whose width corresponds to the count number held in the latch circuit 27, namely, the momentary rotation phase of the head motor. The output pulses of pulse width modulator 28 is applied to the lowpass filter 20 through the switch circuits 26 and 19. The lowpass filter 20 generates a motor control DC signal whose magnitude corresponds to the above-mentioned pulse width, that is, the momentary rotation phase of the head motor 10, thereby controlling its rotation phase.

With the above-mentioned type of head motor servo system, the AFC system precedes the APC system. Namely, the heat motor 10 first has its rotation speed captured within the predetermined speed range by the AFC system, and then its rotation phase controlled by the APC system. The output signal of the divide-by-2 frequency divider 22 is recorded on a magnetic tape through a control head in the recording mode. The control pulse recorded on the magnetic tape is used, in the reproduction mode, as a capstan rotating information signal of later described capstan APC system. The reference signal for the disk APC system in the reproduction mode is produced by a decode output 29 of the counter 24 for a predetermined count number. While a vertical synchronizing signal is supplied, the decoded output 29 ceases to be issued. Alternatively, in the reproduction mode, as the reference signal for head disk APC system, the reproduced control pulse may be used in place of the decoded output 29.

FIG. 2 shows a typical timing chart for the above-mentioned servo system. FIG. 2A shows the output reference signal of the frequency divider 22; FIG. 2B the CLEAR pulse supplied to the digital counter 24; FIG. 2C the output of the flip-flop circuit 15; and FIG. 2D the TACHO pulse.

Figure 3:
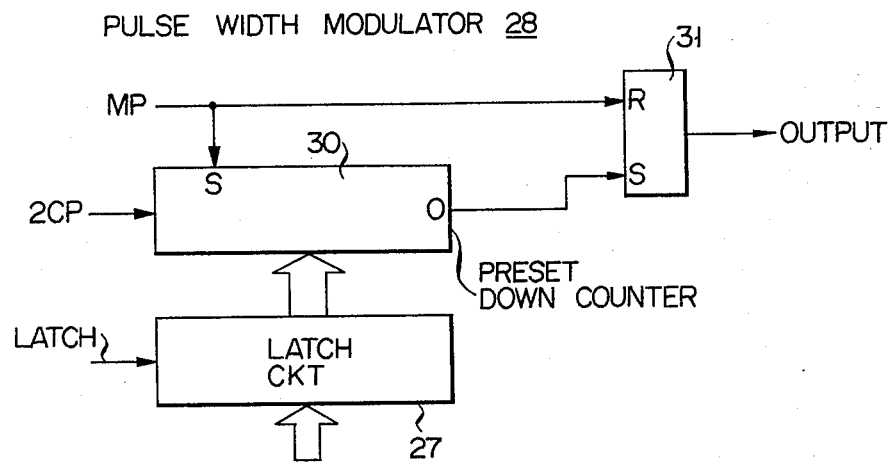
FIG. 3 is a block diagram of one embodiment of the pulse width modulator of FIG. 1.

There will now be described by reference to FIG. 3 one embodiment of the pulse width modulator 28. A carrier pulse MP having a suitable frequency is supplied to a set input S of a preset-down counter 30 and also to a reset input R of a flip-flop circuit 31. Upon application of the carrier pulse to the set input S, a count number held in the latch circuit 27 is loaded into the preset-down counter 30. This preset-down counter 30 is supplied with a pulse 2Cp for down-counting whose frequency is twice as high as that of the clock pulse CP. As the result, the preset-down counter 30 is counted down by the 2CP clock pulse from the preset count number. When the counter 30 is counted down to zero, the flip-flop circuit 31 is set. A time interval between the resetting and setting of the flip-flop circuit 31 depends on the count number held in the latch circuit 27. Though, therefore, the output signal of the flip-flop circuit 31 has the same frequency as the carrier pulse MP, the pulse duty factor of the output signal varies with a count number held in the latch circuit 27. In other words, the carrier pulse MP has its width modulated.

Figure 5:
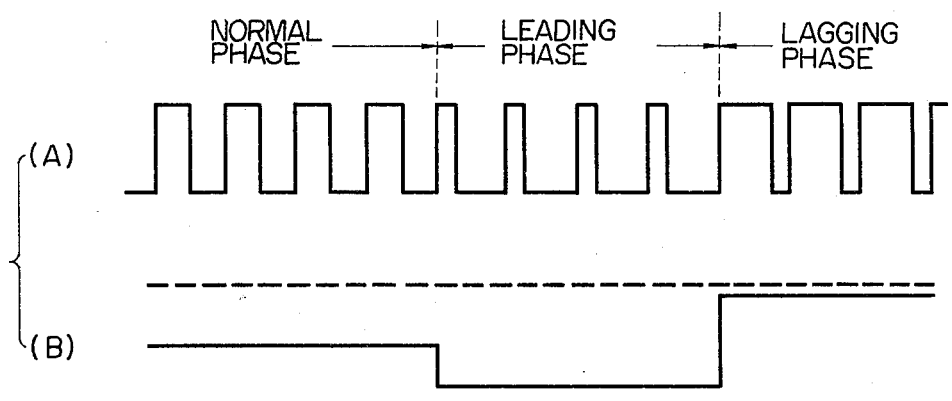
FIG. 5 is shows the waveform of an output signal from the pulse width modulator and the waveform of an output signal from a lowpass filter.

FIG. 5 (A) indicates waveforms of output signals of the pulse width modulator 28 at the various rotation phases of the head motor within the predetermined range. FIG. 5 (B) shows output states of the lowpass filter 20 which respectively correspond to the outputs of pulse width modulator shown in FIG. 5 (A). The output voltage of the lowpass filter 20 has a magnitude corresponding to a duty factor of output signal of the pulse width modulator 28. The head motor 10 is controlled by the DC output of the lowpass filter 20, until the head motor 10 has the proper rotation phase.

Figure 4:
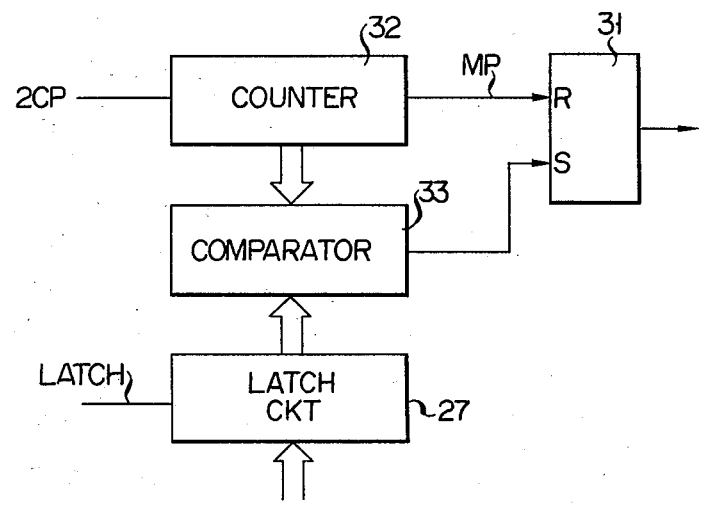
FIG. 4 is a block diagram of another embodiment of the pulse width modulator.

FIG. 4 is a block diagram of another empodiment of the pulse width modulator 28. The clock pulse 2CP is supplied to a ripple counter 32 having the same number of bit stages as the latch circuit 27. A frequency-divided output signal from the last bit stage of the ripple counter 32 is supplied as a carrier pulse to the reset input of the flip-flop circuit 31. Comparison is made by a comparator 33 between a count made by the ripple counter 32 and a count held in the latch circuit 27. Where coincidence occurs between both counts, then the comparator 33 sends forth a set pulse to the flip-flop circuit 31. In the pulse width modulater of FIG. 4, as in the embodiment of FIG. 3, the flip-flop circuit 31 produces a pulse width-modulated output signal whose width varies with a count held in the latch circuit 27, though having the same frequency as the reset pulse MP.

The disk system is less affected by external disturbances than the capstan system. Therefore, the range of linear control by an output signal of the pulse width modulator 28 of the disk APC servo system, namely, a time interval TL between the lower limit phase detection signal of the digital counter 24 and the upper limit phase detection signal may be 5 to 10% of one period (1/30 sec) of the rotation phase detection signal TA-CHO. Where the above-mentioned interval TL is about 2.28 milli seconds, then a number of clock pulses (whose frequency is taken to be 895 KHz) counted during the period is about $2^{11}$. This means that the latch circuit 27 has only to be coupled with lower eleven bits of the digital counter 24. Consequently, the digital counter, comparator and latch circuit of FIGS. 3 and 4 may be formed of eleven bit stages. However, the digital counter 24 is, for example, of a 15-bit type. The frequency of the carrier pulse MP may be chosen to be $2 \times 895/2^{11} \approx 874$ $H_z$. The carrier pulse MP having such frequency ensures modulation degree of substantially 100%.

Figure 6:
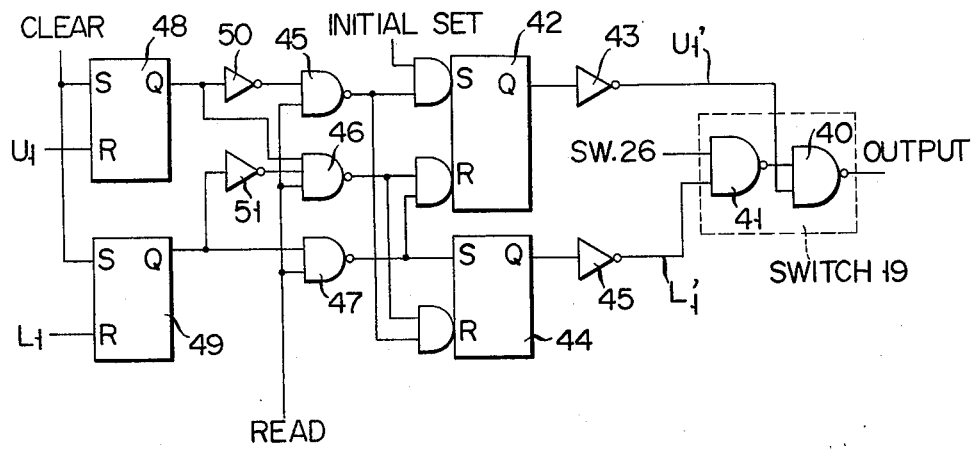
FIG. 6 is a block diagram of the rotation speed detector of FIG. 1.

FIG. 6 shows a practical arrangement of the rotation speed detector 18 and the switch circuit 19. The switch circuit 19 is provided with NAND gates 40 and 41. The NAND gate 40 has one input connected to the output U1' of the rotation speed detector 18 and the other input connected to the output of the NAND gate 41. The NAND gate 41 has one input connected to the output L1' of the rotation speed detector 18 and the other input connected to the output of the switch circuit 26. The above-mentioned output U1' is coupled to the output of an inverter 43 whose input is connected to the Q output of a flip-flop circuit 42. The output L1' is coupled to the output of an inverter 45 whose input is connected to the Q output of a flip-flop circuit 44. The flip-flop circuit 42 is initially set by an initial set input signal produced when power is applied to the video tape recorder to render the Q output thereof LOW. Therefore, upon application of power, the output of the switch circuit 19 goes HIGH, thereby accelerating the head motor 10.

Figure 7:
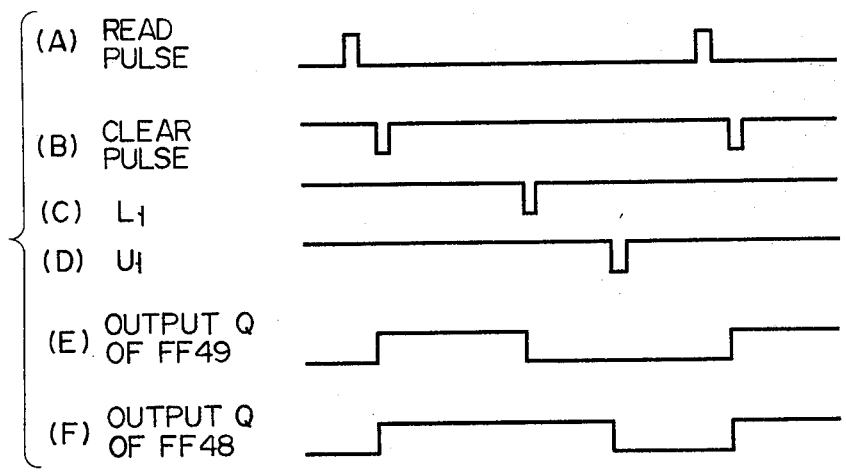
FIG. 7 is a timing chart useful in explaining the operation of the rotation speed detector of FIG. 1.

A READ pulse of FIG. 7A is supplied to a NAND gate 45 whose output is connected to the set input of the flip-flop circuit 42, a NAND gate 46 whose output is connected to the reset input of the flip-flop circuit 42, and a NAND gate 47 whose output is connected to the set input of flip-flop circuit 44. The NAND gate 45 is connected to the Q output of a flip-flop circuit 48 through an inverter 50. The NAND gate 47 is connected to the Q output of a flip-flop circuit 49. The NAND gate 46 is connected to the Q output of the flip-flop circuit 49 through an inveter 51, and also to the Q output of the flip-flop circuit 48. The set inputs of the flip-flop circuits 48 and 49 are supplied with a CLEAR pulse of FIG. 7B. The reset input of the flip-flop circuit 48 is coupled to the upper limit speed detection output U1 (FIG. 7(D)) of the counter 17. The reset input of the flip-flop circuit 49 is coupled to the lower limit speed detection output L1 (FIG. 7 (C)) of the counter 17. FIG. 7E shows the waveform of Q output of the flip-flop circuit 49, and FIG. 7F indicates the waveform of Q output of the flip-flop circuit 48.

The timing chart of FIG. 7 represents the case where the head motor 10 is rotated at a slower rate than the lower limit speed, and consequently the upper limit speed detection signal U1 of counter 17 appears during the time interval between two adjacent READ pulses. When the head motor 10 is rotated too slowly, the flip-flop circuit 42 is set by a READ pulse, causing the out put U1' of the rotation speed detector 18 to go LOW, and, namely, the output of the switch circuit 19 to go HIGH. As the result, the head motor 10 is accelerated.

When a READ pulse is issued before the generation of a lower limit speed detection signal L1 from counter 17, namely, when the head motor 10 is rotated at a higher rate than the upper limit speed, the output of the NAND gate 47 is made to go LOW by the READ pulse, thereby resetting the flip-flop circuit 42, and setting the flip-flop circuit 44. Accordingly, the output U1' of the rotation speed detector 18 goes HIGH and the output L1' goes LOW. At this time, the output of the NAND gate 41 goes HIGH and thus the output of the switch circuit 19 goes LOW, thereby decelerating the head motor 10.

When a READ pulse appears between the lower limit speed detection signal L1 and the upper limit speed detection signal U1, namely, when the head motor 10 is rotated at a speed falling within the predetermined range, the output of NAND gate 46 alone is made to go LOW by the READ pulse, causing both flip-flop circuits 42 and 44 to be reset. As the result, both output U1' and L1' go HIGH to enable the switch circuit 19 so that the output of switch circuit 19 depends on the output state of the switch circuit 26 of APC system.

Figure 8:
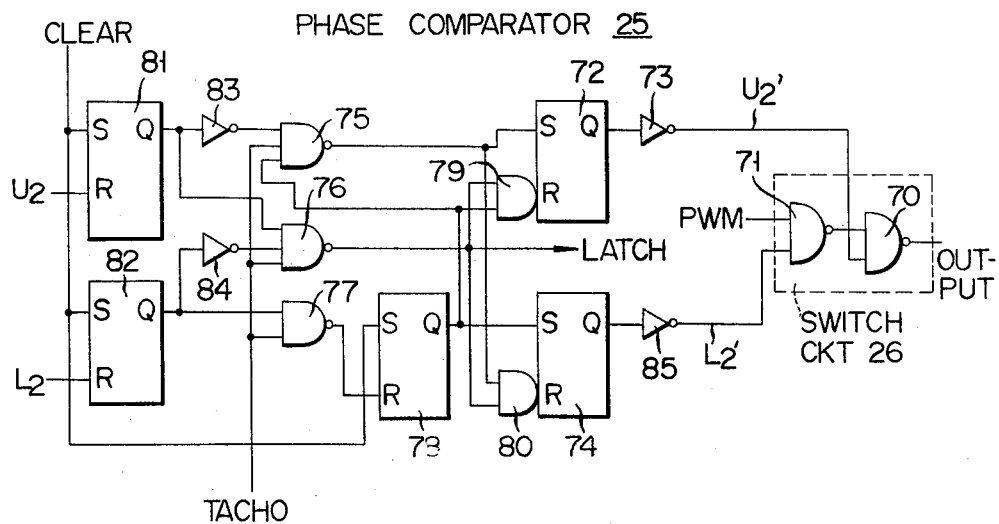
FIG. 8 is a block diagram of the digital phase comparator of FIG. 1.

FIG. 8 shows a practical arrangement of the phase comparator 25 and switch circuit 26. The switch circuit 26 comprises NAND gates 70 and 71. The NAND gate 70 has one input coupled with the output U2' of the phase comparator 25 and the other input coupled with the output of the NAND gate 71. The NAND gate 71 has one input coupled with the output L2' of the phase comparator 25 and the other input coupled with the output of the pulse width modulator 28.

As seen from FIG. 8, the phase comparator 25 is comprised of RS flip-flop circuits 72, 74, 78, 81, 82; NAND gates 75, 76, 77; inverters 73, 83, 84, 85; and AND gates 79, 80.

Figure 9:
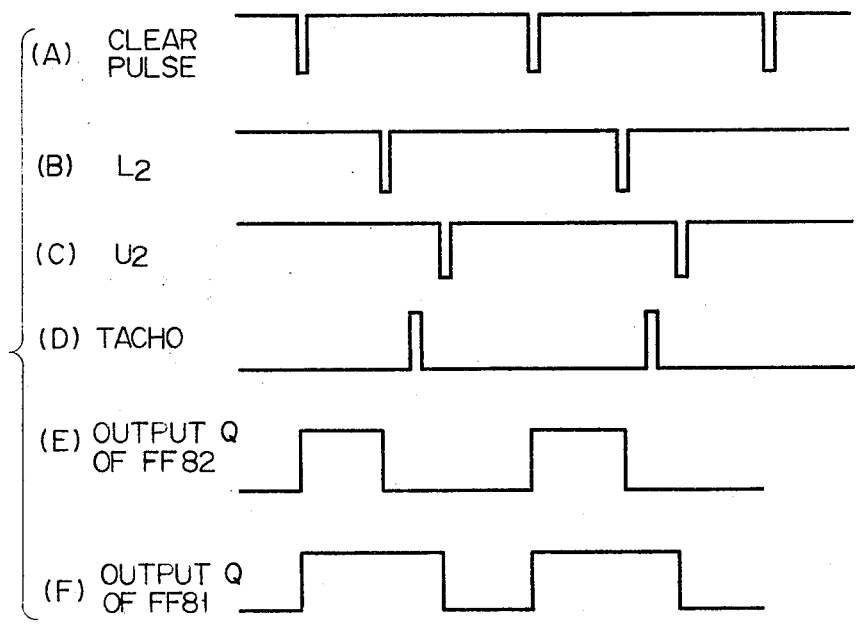
FIG. 9 is a timing chart useful in explaining the operation of the phase comparator of FIG. 8.

FIG. 9 is a timing chart representing the case where the rotation phase of the head motor 10 falls within the predetermined range, and consequently the rotation phase detection signal TACHO is issued during the interval between the lower limit phase detection output L2 and the upper limit phase detection output U2 from the counter 24.

The flip-flop circuits 78, 81, 82 are set by a CLEAR pulse of FIG. 9A. The flip-flop circuit 81 is reset, as shown in FIG. 9F, by the upper limit phase detection output U2 of FIG. 9C from the digital counter 24. The flip-flop circuit 82 is reset, as shown in FIG. 9E, by the lower limit phase detection output L2 of FIG. 9B from the digital counter 24.

When the rotation phase detection signal TACHO is supplied to the NAND gates 75, 76, 77 in the timing of FIG. 9D, the output of NAND gate 76 alone changes from a HIGH to a LOW level. The LOW level output of the NAND gate 76 which has the same duration as the rotation phase detection signal TACHO is used as the LATCH signal. When the output of the NAND gate 76 goes LOW, the flip-flop circuits 72 and 74 are reset. As the result, Q outputs of the flip-flop circuits 72 and 74 go LOW, causing the output U2' of phase comparator 25 to go HIGH. Accordingly, the NAND gates 70 and 71 are enabled to feed an output signal from the pulse width modulator 28 to the switch circuit 19.

When the rotation phase detection signal TACHO appears before the issue of the lower limit phase detection output L2 from the counter 24, namely, when the rotation phase of the head motor 10 is too much advanced relative to the reference signal, the output of NAND gate 77 is made to go LOW by the rotation phase detection signal TACHO, thereby resetting the flip-flop circuit 78. Since, at this time, the Q output of flip-flop circuit 78 goes LOW, the flip-flop circuit 72 is reset, and the flip-flop circuit 74 is set. Accordingly, the output U2' goes HIGH and, on the other hand, the output L2' goes LOW. Therefore, the output of NAND gate 71 goes HIGH, and the output of NAND gate 70 goes LOW. Namely, the output of switch circuit 26 goes LOW, causing the head motor 10 to be decelerated within the predetermined range of its rotation speed.

When the rotation phase detection signal TACHO is produced after generation of the upper limit phase detection output U2 from the counter 24, namely, when the rotation phase of the head motor 10 is too much delayed relative to the reference signal, the output of NAND gate 75 is alone made to go LOW by the TACHO signal, causing the flip-flop circuit 72 to be set and the flip-flop circuit 74 to be reset. Therefore, the output U2' goes LOW, and the output of switch circuit 26 goes HIGH. Namely when the rotation phase of the head motor 10 is too much delayed relative to the reference signal, the head motor 10 is accelerated within the predetermined speed range. As mentioned above, the rotation phase of the head motor 10 is controlled by the APC system, until head motor 10 comes to have a proper phase relationship with respect to the reference signal.

FIG. 10 shows a capstan digital servo system. With this capstan digital servo system, the AFC and APC servo are simultaneously performed. This is for the reason that the capstan system is more affected by external disturbances than the disk system, and the capstan should be driven under a stable condition. The capstan digital servo system has substantially the same function as the abovementioned disk digital servo system.

Like the aforesaid disk APC system, the capstan APC system is constructed of a digital counter 90, latch circuit 91, phase comparator 92, pulse width modulator 93, switch circuits 94 and 95 and lowpass filter 96. The AFC system is constructed of a digital counter 99, latch circuit 98, pulse width modulator 100, switch circuit 101 and lowpass filter 102. An output signal of the lawpass filter 96 of the APC system, and an output signal of the lowpass filter 102 are synthesized by an adder 103, to control a capstan motor through a control amplifier (not shown).

In the recording mode, a clear pulse for the digital counter 90 of the APC system is the output pulse from the wave shaper 23 of FIG. 1 which is obtained from the vertical synchronizing signal. In the reproduction mode, a clear pulse for the digital counter 90 is a pulse appearing at the output 29 of the digital counter 24, which is supplied to a tracking adjusting circuit 106. The clear pulses of the counter 90 in the recording and reproduction modes are selectively applied to the counter 90 through a recording-reproduction changeover switch 104. The phase comparator 92 is selectively supplied with, in the reproduction mode, a control pulse reproduced by the control head (which is reversed by an inverter to have the opposite phase to the recorded control pulse) and, in the recording mode, a capstan rotation phase detection signal (whose frequency is divided into 30 Hz) obtained from a head for detecting the rotation of capstan through a switch 105 ganged with the above mentioned switch 104.

The digital counter 97 and rotation speed detector 99 in the AFC system are supplied with the capstan rotation phase detection signal. Where the capstan is rotated at a speed falling within the predetermined range, the rotation speed detector 99 produces a LATCH signal upon receipt of the capstan rotation phase detection signal, causing a count number of the digital counter 97 representing the rotation speed of the capstan to be loaded into the latch circuit 98. An output pulse signal of the pulse width modulator 100 whose width varies with the digital value in the latch circuit 98 properly controls the rotation speed of the capstan.

What we claim is:

1. A digital servo control system for a rotating member in which the phase difference between a reference signal having a predetermined period and a rotation phase information signal related to the rotating member is detected and utilized to control the rotation of the rotating member, said system comprising:

a counter for counting clock signals and arranged to be cleared at the period of said reference signal;

a latch circuit responsive to a latch signal for latching an instantaneous count determined by said counter;

pulse width modulation circuit means for producing an output pulse signal having a pulse width which is a function of the count information latched by said latch circuit;

driving means having an input coupled to an output of said pulse width modulation circuit means for controlling the rotation of said rotating member in accordance with the pulse width of output pulse signal of said pulse width modulation circuit means; and digital phase comparing means responsive to outputs of said counter and said rotation phase information signal for producing said latch signal only when said rotation phase information signal occurs during a time interval between a time at which said counter counts a first predetermined count number and a time at which said counter counts a second predetermined count number.

2. A system of claim 1 further comprising switch circuit means connected between said pulse width modulation circuit means and said driving means and responsive to said digital phase comparing means for fixing an input of said driving means at a predetermined potential level without coupling said pulse width modulation circuit means to the input of said driving means when the rotation phase information signal of said rotation member occurs before or after the first and second count number counting times of said counter.

3. A system of claim 2 wherein said switch circuit means is so arranged to fix the input of said driving means at a first potential level when the roation phase information signal occurs before said counter counts the first and second count numbers, and at a second potential level when the rotation phase information signal occurs after said counter counts the first and second counter numbers, and to couple said pulse width modulation circuit means to the input of said driving means when the rotation phase information signal occurs during a time interval between the time at which said counter counts the first count number and the time at which said counter counts the second count number.

4. A digital servo control system for a rotating member in which the phase difference between a reference signal having a predetermined period and a rotation phase information signal related to the rotating member is detected and utilized to control the rotation of the rotating member, said system comprising:

a first counter for counting clock signals and arranged to be cleared at the period of said reference signal;

a latch circuit responsive to a latch signal for latching an instantaneous count determined by said counter;

pulse width modulation circuit means for producing an output pulse signal having a pulse width which is a function of the count information latched by said latch circuit;

driving means having an input coupled to an output of said pulse width modulation circuit means for controlling the rotation of said rotating member in accordance with the pulse width of output pulse signal of said pulse width modulation circuit means;

digital phase comparing means responsive to outputs of said first counter and said rotation phase information signal for producing said latch signal only when said rotation phase information signal occurs during a time interval between a time at which said first counter counts a first predetermined count number and a time at which said first counter counts a second predetermined count number;

switch circuit means connected between said pulse width modulation circuit means and said driving means and responsive to said digital phase comparing means for fixing an input of said driving means at a predetermined potential level without coupling said pulse width modulation circuit means to the input of said driving means when the rotation phase information signal of said rotating member occurs before or after the first and second count number counting times of said counter;

a second counter detecting the rotation speed of said rotating member by counting clock signals and arranged to be cleared at a period of the rotation phase information signal; and second switch circuit means coupled between said first switch circuit means and said driving means and responsive to said second counter to fix the input of said driving means at such a potential level as accelerates said rotating member when the rotation speed of said rotating member is below a predetermined lower limit speed and at such a potential level as declerates said rotating member when the rotation speed of said rotating member is above a predetermined upper limit speed, and to couple the output of said first switch circuit means to the input of said driving means when the rotation speed of said rotating member is between the lower and upper limit speeds.

5. A digital servo control system for a rotating member in which the phase difference between a reference signal having a predetermined period and a rotation phase information signal related to the rotating member is detected and utilized to control the rotation of the rotating member said system comprising:

a counter for counting clock signals and arranged to be cleared at the period of said reference signal;

a latch circuit responsive to a latch signal for latching an instantaneous count determined by said counter;

pulse width modulation circuit means for producing an output pulse signal having a pulse width which is a function of the count information latched by said latch circuit, said pulse width modulation circuit means comprising:

a preset downcounter connected said latch circuit and responsive to application of a carrier pulse signal thereto to preset therein the count information of said latch circuit, said down-counter being counted down by clock signal having a fixed frequency, and a flip-flop circuit responsive to the carrier pulse signal and an output of said preset down-counter to produce an output pulse signal havng a pulse width which is a function of the count information in said latch circuit;

driving means having an input coupled to an output of said pulse width modulation circuit means for controlling the rotation of said rotating member in accordance with the pulse width of output pulse signal of said pulse width modulation circuit means; and digital phase comparing means responsive to outputs of said counter and said rotation phase information signal for producing said latch signal only when said rotation phase information signal occurs during a time interval between a time at which said counter counts a first predetermined count number and a time at which said counter counts a second predetermined count number.

6. A digital servo control system for a rotating member in which the phase difference between a reference signal having a predetermined period and a rotation phase information signal related to the rotating member is detected and utilized to control the rotation of the rotating member said system comprising:
   a counter for counting clock signals and arranged to be cleared at the period of said reference signal;
   a latch circuit responsive to a latch signal for latching an instantaneous count determined by said counter;
   pulse width modulation circuit means for producing an output pulse signal having a pulse width which is a function of the count information latched by said latch circuit, said pulse width modulation circuit means including:
      a second counter counting and frequency-dividing a clock pulse signal having a fixed frequency;
      a comparator comparing count information of said second counter with the count information in said latch circuit; and
      a flip-flop circuit responsive to a divided output of said second counter and an output of said comparator to produce an output pulse signal having a pulse width which is a function of the count information in said latch circuit;
   driving means having an input coupled to an output of said pulse width modulation circuit means for controlling the rotation of said rotating member in accordance with the pulse width of output pulse signal of said pulse width modulation circuit means; and
   digital phase comparing means responsive to outputs of said counter and said rotation phase information signal for producing said latch signal only when said rotation phase information signal occurs during a time interval between a time at which said counter counts a first predetermined count number and a time at which said counter counts a second predetermined count number.

7. A system according to claim 1 wherein said driving means includes a low pass filter.

8. A digital servo control system for a rotating member comprising:
   a first counter for counting clock signals and arranged to be cleared at the period of a reference signal;
   a latch circuit coupled to said first counter for latching therein an instantaneous count number of said first counter responsive to a latching signal;
   pulse width modulation circuit means coupled to said latch circuit for producing an output pulse signal having a pulse width which is a function of the count number in said latch circuit;
   driving means having a low pass filter circuit means coupled to said pulse width modulation circuit means for driving said rotation member in accordance with a DC voltage whose magnitude is a function of the pulse width of the output pulse signal of said pulse width modulation circuit means;
   means for producing a rotation phase information signal indicative of the rotation phase of said rotating member being rotated;
   digital phase comparison means responsive to outputs of said first counter and the rotation phase information signal of said rotating member for producing the latch signal only when the rotation phase information signal of said rotating member occurs during a time interval between a time at which said first counter counts a first predetermined count number and a time at which said first counter counts a second predetermined count number;
   speed detection means having a second counter for counting clock signals with a fixed frequency and arranged to be cleared at the period of the rotation phase information signal for detecting the rotation speed of said rotating member;
   first switch circuit means coupled between said pulse width modulation circuit means and said driving means and responsive to said digital phase comparison means for fixing an input of said driving means at a predetermined potential without coupling said pulse width modulation circuit means to said driving means when the rotation phase information signal of said rotating member occurs before or after both the first and second count number counting times of said first counter; and
   second switch circuit means coupled between said first switch circuit means and said driving means and responsive to said speed detection means to fix the input of said driving means at a first potential level for accelerating said rotating member when the rotation speed of said rotating member is below a predetermined lower limit speed and at a second potential level for decelerating said rotating member when the rotation speed of said rotation member is above a predetermined upper limit speed, and for coupling the output of said first switch circuit means to the input of said driving means when the rotation speed of said rotating member is between the lower and upper limit speeds.

9. A system according to claim 8 wherein said first and second switch circuits each include a pair of logic gates.

10. A system according to claim 9 wherein said logic gates are NAND gates.

* * * * *